United States Patent [19]

Hester, Jr.

[11] 3,856,792
[45] Dec. 24, 1974

[54] 2-[2-(SUBSTITUTED AMINOMETHYL)-4H-1,2,4-TRIAZOL-4-YL]BENZOPHENONES

[75] Inventor: Jackson B. Hester, Jr., Galesburg, Mich.

[73] Assignee: The Upjohn Company, Kalamazoo, Mich.

[22] Filed: June 21, 1973

[21] Appl. No.: 372,313

Related U.S. Application Data

[63] Continuation-in-part of Ser. No. 240,756, April 3, 1972, abandoned, which is a continuation-in-part of Ser. No. 114,049, Feb. 9, 1971, Pat. No. 3,709,898.

[52] U.S. Cl.... 260/247.5 R, 260/247.1, 260/293.69, 260/308 R, 424/248, 424/267, 424/269
[51] Int. Cl.. C07d 55/06, C07d 57/00, C07d 99/02
[58] Field of Search..... 260/293.69, 247.1, 247.5 E, 260/308 R

[56] References Cited
UNITED STATES PATENTS
3,709,818  1/1973  Hester........................... 260/308 R

OTHER PUBLICATIONS

Derieg et al., Chem. Abstracts, Vol. 74, Abstract No. 125579e (1971), QD1A51.
Gall, Chem. Abstracts, Vol. 78, Abstract No. 136302t (1973), QD1A51.
Hester et al., Chem. Abstracts, Vol. 78, Abstract No. 136354m (1973), QD1A51.

*Primary Examiner*—Alton D. Rollins

[57] ABSTRACT

2-[2-(Substitutedaminomethyl)-4H-1,2,4-triazol-4-yl]benzophenones of the formula II:

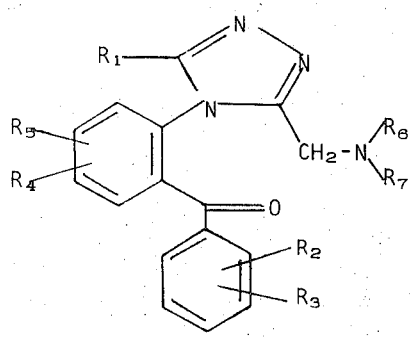

wherein $R_1$ is selected from the group consisting of hydrogen, alkyl of 1 to 3 carbon atoms, inclusive, and cyclopropyl; wherein $R_2$, $R_3$, $R_4$, and $R_5$ are selected from the group consisting of hydrogen, alkyl defined as above, fluorine, chlorine, bromine, nitro, trifluoromethyl, and alkylthio in which alkyl is defined as above; and wherein $R_6$ and $R_7$ are selected from the group consisting of hydrogen and alkyl of 1 to 5 carbon atoms, inclusive, with the proviso that only one of the parameters $R_6$ or $R_7$ can be hydrogen, or together

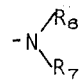

is a heterocyclic amine, e.g. pyrrolidino, piperidino, morpholino, or hexamethyleneimino which can be further substituted with alkyl groups, are prepared by condensing a compound of formula I:

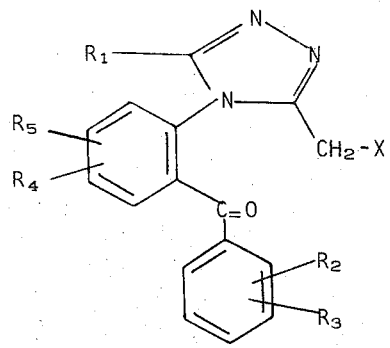

wherein $R_1$, $R_2$, $R_3$, $R_4$, and $R_5$ are defined as above, and X is chlorine, bromine, or iodine, with an amine of the formula:

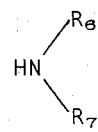

wherein $R_6$ and $R_7$ or together

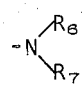

are defined as above.

The products of formula II and the pharmacologically acceptable acid addition salts thereof are useful as sedatives and tranquilizers for mammals and birds.

13 Claims, No Drawings

3,856,792

2-[2-(SUBSTITUTED-AMINOMETHYL)-4H-1,2,4-TRIAZOL-4-YL]BENZOPHENONES

CROSS REFERENCE TO RELATED APPLICATIONS

This application is a continuation-in-part of application Ser. No. 240,756 filed Apr. 3, 1972, and now abandoned, which is a continuation-in-part of application Ser. No. 114,049, filed Feb. 9, 1971, now U.S. Pat. No. 3,709,898, granted Jan. 9, 1973.

BACKGROUND OF THE INVENTION

FIELD OF THE INVENTION

This invention is directed to new organic compounds and is particularly concerned with novel 2-[3-(substituted-aminomethyl)-4H-1,2,4-triazol-4-yl]benzophenones and a process for the production thereof.

The novel compounds of formula II and the process of production therefor can be illustratively represented as follows:

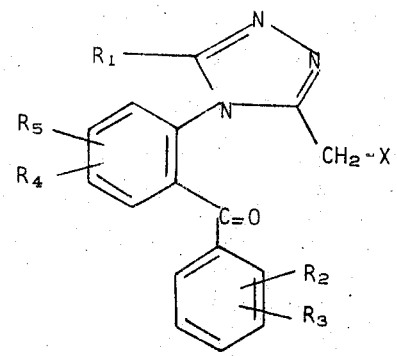

I

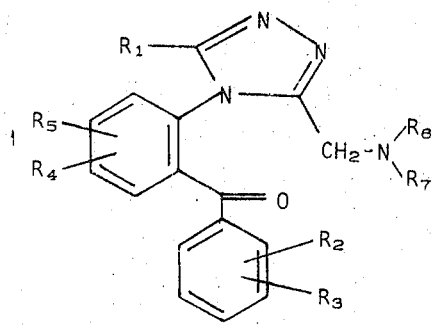

II wherein $R_1$ is selected from the group consisting of hydrogen, alkyl of 1 to 3 carbon atoms, inclusive, and cyclopropyl; wherein $R_2$, $R_3$, $R_4$, and $R_5$ are selected from the group consisting of hydrogen, alkyl defined as above, fluorine, chlorine, bromine, nitro, trifluoromethyl, and alkylthio, in which alkyl is defined as above; and wherein $R_6$ and $R_7$ are selected from the group consisting of hydrogen and alkyl of 1 to 5 carbon atoms, inclusive, with the proviso that only one of the parameters $R_6$ or $R_7$ is hydrogen, or together the group

is a heterocyclic amino group selected from pyrrolidino, piperidino, morpholino, and hexamethyleneimino.

The more preferred compounds of this invention are of the formula IIA:

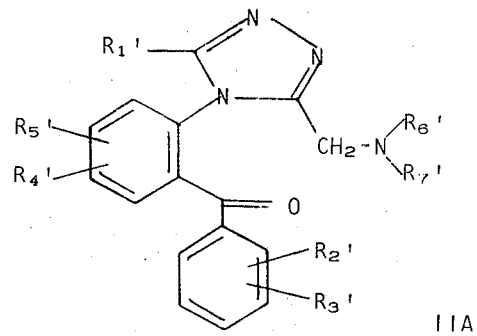

IIA wherein $R_1'$ is hydrogen or alkyl of 1 to 3 carbon atoms, inclusive, wherein $R_2'$, $R_3'$, $R_4'$, and $R_5'$ are hydrogen or halogen wherein $R_6$ and $R_7$ are selected from the group consisting of hydrogen and alkyl as defined above, with the proviso that only one of the parameters $R_6'$ or $R_7'$ can be hydrogen or together

is selected from the group consisting of pyrrolidino, piperidino, and morpholino, and the pharmacologically acceptable acid salts thereof.

The compounds most preferred have the formula IIB:

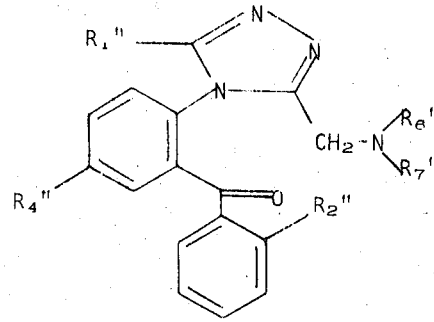

IIB wherein $R_1''$ is hydrogen or methyl; wherein $R_2''$ and $R_4''$ are hydrogen or chlorine, and wherein $R_6''$ is hydrogen, methyl, or ethyl, $R_7''$ is methyl or ethyl together

are selected from the group consisting of pyrrolidino, piperidino, and morpholino, and the pharmacologically acceptable acid addition salts thereof.

The invention, moreover, encompasses also the pharmacologically acceptable acid salts of the compounds of formula II above.

The process of this invention comprises: treating a compound I at a temperature between 0 and 100° C. with an amine of the formula

wherein $R_6$ and $R_7$ or

are defined as above, in an inert organic solvent to give the compound of formula II above.

DESCRIPTION OF THE PREFERRED EMBODIMENT

Alkyl groups of 1 to 3 carbon atoms, inclusive, are exemplified by methyl, ethyl, propyl, and isopropyl.

Alkylthio can be methylthio, ethylthio, propylthio, and isopropylthio.

The compounds of the formulae II including acid addition salts thereof have sedative, tranquilizing, and muscle relaxant effects in birds, and mammals, including man.

The acid addition salts of compounds of formula II contemplated in this invention, are the hydrochlorides, hydrobromides, hydriodides, sulfates, phosphates, cyclohexanesulfamates, methanesulfonates, and the like, prepared by reacting a compound of formula II with an excess of the selected pharmacologically acceptable acid.

Sedative effects of 5-chloro-2-[3-(diethylaminoethyl)-5-methyl-4H-1,2,4-triazol-4-yl]benzophenone are shown by the following tests in mice:

Chimney test

[Med. Exp. 4, 145 (1961)]: The effective intraperitoneal dosage for 50% of the mice ($ED_{50}$) is 0.6 mg./kg. The test determines the ability of mice to back up and out of a vertical glass cylinder within 30 seconds. At the effective dosage, 50% of the mice failed doing it.

Dish test

Mice in Petri dishes (10 cm. diameter, 5 cm. high, partially embedded in wood shavings), climb out in a very short time, when not treated. Mice remaining in the dish for more than 3 minutes indicate tranquilization. $ED_{50}$ equals the dose of the test compound at which 50% of the mice remain in the dish. The $ED_{50}$ (intraperitoneal administration) in this test is 1.0 mg./kg.

Pedestal test

The untreated mouse leaves the pedestal in less than a minute to climb back to the floor of the standard mouse box. Tranquilized mice will stay on the pedestal for more than 1 minute. The $ED_{50}$ (intraperitoneal administration) for 5-chloro-2-[3-(diethylaminomethyl)-5-methyl-4H-1,2,4-triazol-4-yl]benzophenone in this test is 1.5 mg./kg.

Nicotine antagonism test

Mice in a group of 6 are injected with the test compound, 5-chloro-2-[3-(diethylaminomethyl)-5-methyl-4H-1,2,4-triazol-4-yl]benzophenone. Thirty minutes later the mice including control (untreated) mice are injected with nicotine salicylate (2 mg./kg.). The control mice show overstimulation, i.e., (1) running convulsions followed by (2) tonic extensor fits followed by (3) death. An intraperitoneal dosage of 0.2 mg./kg. of the test compound protected 50% of the mice against (2) and (3) ($ED_{50}$).

Antagonism to strychnine (as sulfate)

The effective dosage ($ED_{50}$) of 5-chloro-2-[3-(diethylaminomethyl)-5-methyl-4H-1,2,4-triazol-4-yl]benzophenone is 45 mg./kg. orally in mice. The test consists in orally administering into groups of 6 mice the test compound, and 30 minutes later 3 mg./kg. strychnine sulfate intraperitoneally. The survivors after 4 hours reflect the activity of the compounds as a muscle relaxant and antispasmodic. A dosage of 3 mg./kg. of strychnine sulfate is routinely fatal to all the control mice. The following compounds have an $ED_{50}$ (by intraperitoneal injection) as shown in Table I below:

TABLE I

| COMPOUND | Ch | D | P | Ni |
|---|---|---|---|---|
| 5-chloro-2-[3-(dimethylaminomethyl)-5-methyl-4H-1,2,4-triazol-4-yl]benzophenone; | 1.8 | 2.2 | 3.1 | 0.56 |
| 2',5-dichloro-2-[3-(dimethylaminomethyl)-5-methyl-4H-1,2,4-triazol-4-yl]benzophenone | 1.1 | 0.25 | 0.56 | 0.14 |
| 2'-chloro-2-[3-(dimethylaminomethyl)-5-methyl-4H-1,2,4-triazol-4-yl]benzophenone | 18 | 22 | 100 | 5.0 |
| 5-chloro-2-[3-(monomethylaminomethyl)-5-methyl-4H-1,2,4-triazol-4-yl]benzophenone | 0.3 | 0.8 | 0.8 | 0.14 |
| 5-chloro-2-[3-(pyrrolidinomethyl)-5-methyl-4H-1,2,4-triazol-4-yl]benzophenone | 0.7 | 1.3 | 2.3 | 0.4 |
| 5-chloro-2-[3-(morpholinomethyl)-5-methyl-4H-1,2,4-triazol-4-yl]benzophenone | 1.0 | 1.8 | 2.3 | 0.5 |
| 5-chloro-2-[3-(piperidinomethyl)-5-methyl-4H-1,2,4-triazol-4-yl]benzophenone | 1.4 | 2.8 | 2.2 | 0.8 |
| 2',5-dichloro-2-[3-(pyrrolidinomethyl)-5-methyl-4H-1,2,4-triazol-4-yl]benzophenone | 4.0 | 1.0 | 4.0 | 1.8 |

Ch = chimney test
D  = dish test
P  = pedestal test
Ni = nicotine antagonism (3) test The pharmaceutical forms contemplated by this invention include pharmaceutical compositions suited for oral, parenteral, and rectal use, e.g., tablets, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Water or oil, e.g., coconut oil, sesame oil, safflower oil, cottonseed oil, peanut oil may be used for preparing solutions or suspensions of the active drug. Sweetening, coloring and flavoring agents may be added.

For mammals and birds, food premixes, with starch, oatmeal, dried fishmeat, fishmeal, flour and the like can be prepared.

As tranquilizers, the compounds of formula II can be used in dosages of 0.1–5.0 mg./kg. in oral or injectable preparations as described above, to alleviate tension and anxiety in mammals, or birds, such as e.g., occurs when animals are in travel.

The starting materials useful for preparing compounds of formula I of this application are known in the art, e.g. J. Org. Chem. 26, 4491 (1961), ibid. 27, 3781 (1962); ibid. 30, 521 (1965); ibid. 32, 3798 (1967); J. Pharmaceutical Sciences 61, 2508 (1972) Helv. Chim. Acta 45, 2226 (1962) and U.S. Pat. No. 3,121,075. Starting compounds of formula I can be prepared from these starting materials as shown in the Preparations.

In carrying out the process of the present invention, a selected 2-[3-(halomethyl)-4H-1,2,4-triazol-4-yl]benzophenone I is reacted with an amine of the formula

defined as above. The reaction is carried out in an inert organic solvent, such as N,N-dimethylformamide, N,N-dimethylacetamide, dimethylsulfoxide, tetrahydrofuran, dioxane, methylene chloride or the like. The starting material and reagents can be in suspension or in solution during the reaction. The amine is used in equivalent amounts or in excess. In the preferred embodiment of this reaction, the reaction temperature is 0° to 100° C., alkali metal iodide e.g. lithium, sodium or potassium iodide may be used as catalyst and the amine is used at least in slight excess over the stoichiometrically required amount. After the Reaction is terminated (¼ to 24 hours), the desired product is isolated and purified by conventional procedures, e.g. extraction, chromatography and crystallization.

The following examples are illustrative of the processes and products of the present invention, but are not to be construed as limiting.

PREPARATION 1

2'-Benzoyl-4'-chloroacetanilide

Acetyl chloride (81.3 g., 1.037 mole) was added to a stirred solution of 2-amino-5-chlorobenzophenone (200.0 g., 0.864 mole) and pyridine (68.4 g., 0.864 mole) in dry ether (4 l.); the mixture was kept at ambient temperature for 2 hours and treated with 500 ml. of water. The layers were separated and the ether layer was dried over anhydrous sodium sulfate and concentrated. Crystallization of the residue from ethyl acetate-Skellysolve B hexanes gave:

124.0 g. of 2'-benzoyl-4'-chloroacetanilide of melting point 114–115° C. Two more crops of 2'-benzoyl-4'-chloroacetanilide also were obtained: 67.8 g. of melting point 113.5–114.5° C. and 33.0 g. of melting point 113–114° C.

PREPARATION 2

6-Chloro-4-phenyl-2(1H)-quinoline

The procedure (reaction of 2'-benzoyl-4'-chloroacetanilide with sodium hydroxide) of A. E. Drukker and C. I. Judd, J., Heterocyclic Chem. 3, 359 (1966) was used for this preparation. The yield was 77%. Two other preparations have been described: S. C. Bell, T. S. Sulkowski, C. Gochman and S. J. Childress, J. Org. Chem. 27, 562 (1962): G. A. Reynolds and C. R. Hauser, J. Amer. Chem. Soc. 72, 1842 (1950).

PREPARATION 3

2,6-Dichloro-4-phenylquinoline

The procedure of A. E. Drukker and C. I. Judd, J. Heterocyclic Chem. 3, 359 (1966) was used for this preparation. The yield was 62%.

PREPARATION 4

6-Chloro-2-hydrazino-4-phenylquinoline

A stirred mixture of 2,6-dichloro-4-phenylquinoline (2.7 g., 0.02 mole) and hydrazine hydrate (6.8 g.) was refluxed under nitrogen for 1 hour and concentrated in vacuo. The residue was suspended in warm water, and the solid was collected by filtration, dried and recrystallized from ethyl acetate-Skellysolve B hexanes to give 1.81 g. (67% yield) of 6-chloro-2-hydrazino-4-phenylquinoline of melting point 156.5°–157° C.

Anal. calcd. for $C_{15}H_{12}ClN_3$:
  C, 66.79; H, 4.49; Cl, 13.15; N, 15.58.
 Found: C, 67.15; H, 4.65; Cl, 13.19; N, 15.32.
Preparation 5 7-Chloro-1-methyl-5-phenyl-s-triazolo-[4,3-a]quinoline

PREPARATION 5

7-Chloro-1-methyl-5-phenyl-s-triazolo-[4,3-a]quinoline

A stirred mixture of 6-chloro-2-hydrazino-4-phenylquinoline (1.4 g., 0.0052 mole), triethyl orthoacetate (0.925 g., 0.0057 mole) and xylene (100 ml.) was refluxed, under nitrogen, for 2 hours and 40 minutes. During this period the ethanol formed in the reaction was removed by distillation through a short, glass-helix-packed column. The mixture was concentrated to dryness in vacuo and the residue was crystallized from methanol-ethyl acetate to give: 1.02 g. of 7-chloro-1-methyl-5-phenyl-s-triazolo-[4,3-a]quinoline of melting point 253.5°–255° C. and 0.26 g. of melting point 253.5°–255° C. (83.9% yield). The analytical sample was crystallized from methylene chloride: methanol and had a melting point of 252.5°–253.5° C.

Anal. calcd. for $C_{17}H_{12}ClN_3$:
  C, 69.50; H, 4.12; Cl, 12.07; N, 14.31.
  Found: C, 69.38; H, 4.02; Cl, 12.10, N, 14.49.

PREPARATION 6

5-Chloro-2-(3-methyl-4H-1,2,4-triazol-4-yl)-benzophenone (Oxidation of 7-chloro-1-methyl-5-phenyl-s-triazolo[4,3-a]quinoline)

A stirred suspension of 7-chloro-1-methyl-5-phenyl-s-triazolo[4,3-a]quinoline (2.94 g., 0.01 mole) in acetone (110 ml.) was cooled in an ice-bath and treated slowly with a solution prepared by adding sodium periodate (2 g.) to a stirred suspension of ruthenium dioxide (200 mg.) in water (35 ml.). The mixture became dark. Additional sodium periodate (8 g.) was added during the next 15 minutes. The ice bath was removed and the mixture was stirred for 45 minutes. Additional sodium periodate (4 g.) was added and the mixture was stirred at ambient temperature for 18 hours and filtered. The solid was washed with acetone and the combined filtrate was concentrated in vacuo. The residue was suspended in water and extracted with methylene chloride. The extract was dried over anhydrous potassium carbonate and concentrated. The residue was chromatographed on silica gel (100 g.) with 10% of methanol-90% ethyl acetate; 50 ml. fractions were collected. The product was eluted in fractions 10-20 and was crystallized from ethyl acetate to give: 0.405 g. of 5-chloro-2-(3-methyl-4H-1,2,4-triazol-4-yl)benzophenone of melting point 168°-169.5° C. and 0.291 g. of melting point 167.5°-169° (23.4% yield). The analytical sample had a melting point of 168° C.

Anal. calcd. for $C_{16}H_{12}ClN_3O$:
C, 64.54; H, 4.06; Cl, 11.91; N, 14.11.
Found: C, 64.56; H, 4.35; Cl, 11.97; 11.93; N, 14.29.

PREPARATION 7

Oxidation of 7-chloro-1-methyl-5-phenyl-s-triazolo[4,3-a]quinoline

A stirred suspension of 7-chloro-1-methyl-5-phenyl-s-triazolo[4,3-a]quinoline (2.94 g., 0.01 mole) and acetone (200 ml.) was cooled in an ice bath and treated, dropwise, during 16 minutes with a solution prepared from ruthenium dioxide (200 mg.), sodium periodate (4g.) and water (35 ml.). A slight exothermic reaction was noted and the mixture became dark. After 10 minutes 29 ml. of a solution of sodium periodate (12 g.) in water (70 ml.) was added during 10 minutes. This mixture was stirred for 2 hours and then the remaining sodium periodate solution (41 ml.) was added during the next 3 hours. The mixture was concentrated in vacuo to remove acetone. The resulting aqueous mixture was extracted with methylene chloride. The extract was washed with water, dried over anhydrous magnesium sulfate, and concentrated. The residue was chromatographed on silica gel (150 g.) with 2% methanol 98% chloroform; 60 ml. fractions were collected. Recovered starting material was eluted in fractions 11-14 and crystallized from methanol-methylene chloride to give 0.069 g. of melting point 251.5°-253.5° C. A mixture of the two products was eluted in fractions 15-39. Crystallization of this mixture from ethyl acetate gave 618 mg. (20.8%) of 5-chloro-2-(3-methyl-4H-1,2,4-triazol-4-yl)benzophenone of melting point 165.5°-168°.

PREPARATION 8

Oxidation of 7-chloro-1-methyl-5-phenyl-s-triazolo[4,3-a]quinoline

A vigorous stream of ozone in oxygen was bubbled for 12 hours, into a stirred, ice-cold solution of 7-chloro-1-methyl-5-phenyl-s-triazolo[4,3-a]quinoline (31.1 g., 0.106 mole) in methanol (750ml.) and methylene chloride (500 ml.). The resulting mixture was filtered and the filtrate was added to an ice cold solution of sodium iodide (47.5 g.) and acetic acid (63 ml) in water (200 ml.). The solution was decolorized by the addition of sodium thiosulfate and concentrated in vacuo. The residue was mixed with water and extracted with methylene chloride. The extract was washed with water, dried over anhydrous magnesium sulfate and concentrated. The residue was chromatographed on silica gel (1.5 kg.); 175 ml. fractions were collected. Fractions 1 to 128 were eluted with 1% methanol-99% chloroform and fractions 129-168 with 5% methanol-95% chloroform. The first compound was eluted in fractions 49-60 and crystallized from methanol-ethyl acetate to give: 0.769 g. of melting point 229.5°-231° (decomposition) of 7-chloro-1-methyl-5-phenyl-s-triazolo[4,3-a]quinolin-4(5H)-one. The analytical sample had a melting point 232°-233° C.

Anal. calcd. for $C_{17}H_{12}ClN_3O$:
C, 65.92; H, 3.91; Cl, 11.44; N, 13.57.
Found: C, 65.46; H, 3.72; Cl, 11.48; N, 13.59.

Recovered starting material was eluted in fractions 66-78 and crystallized from methylene chloride-methanol to give 0.737 g. of melting point 251-253.5° C. A mixture of two remaining products was eluted in fractions 73-168. Crystallization of this mixture from ethyl acetate gave: 10.8 g. of melting point 166.5°-167.5° C., 0.987 g. of melting point 166°-167° C. and 2.52 g. of melting point 164°-165.5° C. (45.3% yield) of 5-chloro-2-(3-methyl-4H-1,2,4-triazol-4-yl)benzophenone.

PREPARATION 9

5-Chloro-2-[3-(hydroxymethyl)-5-methyl-4H-1,2,4-triazol-4-yl]benzophenone

A stirred mixture of 5-chloro-2-[3-methyl-4H-1,2,4-triazolo-4-yl]benzophenone, (2.98 g., 0.01 mole) paraformaldehyde (3g.) and xylene (100 ml.) was warmed under nitrogen, in a bath maintained at 125° C. for 7 hours. The mixture was then concentrated in vacuo. The residue was chromatographed on silica gel (150 g.) with 3% methanol 97% chloroform. Fifty milliliter fractions were collected. The product was eluted in fractions 20 to 44. The fractions were concentrated and the residue was crystallized from ethanol-ethyl acetate to give: 1.64 g. of melting point 138°-142° C.; 0.316 g. of melting point 138.5°-141° C.; 0.431 g. of melting point 139°-141° C. (72.8% yield) of 5-chloro-2-[3-(hydroxymethyl)-5-methyl-4H-1,2,4-triazol-4-yl]benzophenone. The analytical sample had a melting point of 138°-139° C.

Anal. calcd. for $C_{17}H_{14}ClN_3O_2$:
C, 62.30; H, 4.30; Cl, 10.81; N, 12.82.
Found: C, 62.23; H, 4.22; Cl, 10.82; N, 11.73.

PREPARATION 10

5-Chloro-2-[3-(bromomethyl)-5-methyl-4H-1,2,4-triazol-4-yl]benzophenone

A solution of 5-chloro-2-[3-(hydroxymethyl)-5-methyl-4H-1,2,4-triazol-4-yl]benzophenone (328 mg., 0.001 mole) in dry, hydrocarbon-stabilized chloroform (5ml.) was cooled in an ice bath and treated with phosphorus tribromide (0.1 mol.). The colorless solution was kept in the ice bath for 55 minutes and at ambient temperature (22°–24° C.) for 5 hours. The resulting yellow solution was poured into a mixture of ice and dilute sodium bicarbonate. This mixture was extracted with chloroform. The extract was washed with brine, dried over anhydrous magnesium sulfate and concentrated. The residue was crystallized from methylene chloride-ethyl acetate to give: 0.285 g. of melting point 200°–240° (decomposition) and 0.0030 g. melting point 200°–220° C. (decomposition) of 5-chloro-2-[3-(bromomethyl)-5-methyl-4H-1,2,4-triazol-4-yl]benzophenone. The analytical sample hald a melting point of 200°–240° C. (decomposition).

Anal. calcd. for $C_{17}H_{13}BrClN_3O$:
    C, 52.26; H, 3.35; Br, 20.46; Cl, 9.08; N, 10.76.
Found:  C, 52.13; 52.45; H, 3.77; 3.66; Br, 20.44; Cl, 9.20; N, 10.43.

PREPARATION 11

5-Chloro-2-[3-(chloromethyl)-5-methyl-4H-1,2,4-triazol-4-yl]benzophenone

A solution of 5-chloro-2-[3-(hydroxymethyl)-5-methyl-4H-1,2,4-triazol-4-yl]benzophenone (328 mg., 0.001 mole) in thionyl chloride (2ml.) was warmed during 40 min. to a bath temperature of 78° C. and kept at 78°–83° C. for 1 hour 25 minutes. It was then cooled and poured into ice water. This mixture was neutralized with sodium bicarbonate and extracted with chloroform. The extract was washed with brine, dried over anhydrous magnesium sulfate and concentrated in vacuo. The residue was crystallized from ethyl acetate Skellysolve B hexanes to give: 0.240 g. of 5-chloro-2-[3-(chloromethyl)-5-methyl-4H-1,2,4-triazol-4-yl]benzophenone of melting point 144.5°–147° C. and 0.045 g. of melting point 144.5°–146.5° C. The analytical sample had a melting point of 139°–140° C.

Anal. calcd. for $C_{17}H_{13}Cl_2N_3O$:
    C, 58.76; H, 3.78; Cl, 20.48; N, 12.14.
Found:  C, 59.22; H, 3.80; Cl, 20.66; N, 11.91.

PREPARATION 12

5-Chloro-2-[3-iodomethyl)-5-methyl-4H-1,2,4-triazol-4-yl]benzophenone

5-Chloro-2-[3-(chloromethyl)-5-methyl-4H-1,2,4-triazol-4-yl]benzophenone (346 mg. 0.001 mole) was added to a stirred solution of sodium iodide (300 mg., 0.002 mole) in acetone, and the resulting mixture was stirred at ambient temperature for 6 hours 45 minutes and poured into ice water. This mixture was extracted with chloroform. The extract was washed with brine, dried and concentrated. The residue was crystallized from methylene chloride-ethyl acetate to give: 0.227 g. of 5-chloro-2-[3-(iodomethyl)-5-methyl-4H-1,2,4-triazol-4-yl]benzophenone of melting point 185.5°–188.5° (decomposition). The analytical sample had a melting point of 185°–200° C. (decomposition).

Anal. calcd. for $C_{17}H_{13}ClIN_3O$:
    C, 46.65; H, 2.99; Cl, 8.10; I, 29.00; N, 9.60.
Found:  C, 46.78; H, 2.88; Cl, 8.59; I, 26.98; N, 9.23.

In the manner given in the prior preparations other 2-[3-(halomethyl)-4H-1,2,4-triazol-4-yl]benzophenones can be synthetized, such as:

2',5-dichloro-2-[3-(chloromethyl)-5-methyl-4H-1,2,4-triazol-4-yl]benzophenone;
2'-chloro-2-[3-(bromomethyl)-5-methyl-4H-1,2,4-triazol-4-yl]benzophenone;
2',6'-difluoro-5-chloro-2-[3-(iodomethyl)-5-methyl-4H-1,2,4-triazol-4-yl]benzophenone;
5-nitro-4'-trifluoromethyl-2-[3-(chloromethyl)-4H-1,2,4-triazol-4-yl]benzophenone;
2',5-dichloro-2-[3-(chloromethyl)-5-methyl-4H-1,2,4-triazol-4-yl]benzophenone;
6-ethylthio-2',4'-dimethyl-2-[3-(iodomethyl)5-ethyl-4H-1,2,4-triazol-4-yl]benzophenone;
5,6-dibromo-3'-amino-2-[3-(chloromethyl)-5-ethyl-4H-1,2,4-triazol-4-yl]benzophenone;
5-ethyl-2',4'-dipropyl-2-[3-(chloromethyl)-5-methyl-1,2,4-triazol-4-yl]benzophenone;
2',5-dibromo-2-[3-(chloromethyl)-5-ethyl-4H-1,2,4-triazol-4-yl]benzophenone;
3-propylthio-4'-propyl-2-[3-(bromomethyl)-5-methyl-4H-1,2,4-triazol-4-yl]benzophenone;
4-isopropyl-5-bromo-3-ethyl-2-[3-(bromomethyl)-5-propyl-4H-1,2,4-triazol-4-yl]benzophenone;
and the like.

EXAMPLE 1

5-Chloro-2-[3-(diethylaminoethyl)-5-methyl-4H-1,2,4-triazol-4-yl]benzophenone A stirred suspension of 5-chloro-2-[3-(bromomethyl)-5-methyl-4H-1,2,4-triazol-4-yl]benzophenone (1.16 g. 0.00297 mole) in tetrahydrofuran (45 ml.) was cooled in an ice bath, under nitrogen, and treated with a solution of diethylamine (6 ml.) in methanol (15 ml.). The mixture was stirred at ambient temperature for 18 hours and concentrated in vacuo. The residue was mixed with water and extracted with methylene chloride. The extract was dried over anhydrous potassium carbonate and concentrated. Crystallization of the residue from ethyl acetate Skellysolve B hexanes gave 0.97 g. of 5-chloro-2-[3-(diethylaminomethyl)-5-methyl-4H-1,2,4-triazol-4-yl]benzophenone of melting point 110.5°–111.5° C. The analytical sample had a melting point of 112°–113° C.

Anal. calcd. for $C_{21}H_{23}N_4O$:
    C, 65.87; H, 6.05; Cl, 9.26; N, 14.63.
Found:  C, 65.76; H, 6.36; Cl, 9.26; N, 14.43.

EXAMPLE 2

5-Chloro-2-[3-(dimethylaminomethyl)-5-methyl-4H-1,2,4-triazol-4-yl]benzophenone

A stirred suspension of 5-chloro-2-[3-(bromomethyl)-5-methyl-4H-1,2,4-triazol-4-yl]benzophenone (1.0 g., 0.00256 mole) in tetrahydrofuran (40 ml.) was cooled in an ice bath and treated with 32 ml. of a saturated solution of dimethylamine in methanol. The mixture was removed from the ice bath, stirred at ambient temperature for 30 minutes and concentrated in vacuo. The residue was mixed with water and extracted with methylene chloride. The extract was dried over anhydrous potassium carbonate and concentrated. Crystallization of the residue from ethyl acetate gave 0.52 g. of 5-chloro-2-[3-(dimethylaminomethyl)-5-methyl-4H-1,2,4-triazol-4-yl]benzophenone of melting point 171°–172° C. and 0.14 g. of melting point 168°–170° C.

Anal. calcd. for $C_{19}H_{19}ClN_4O$:
C, 64.31; H, 5.50; Cl, 9.99; N, 15.79.
Found: C, 63.99; H, 5.49; Cl, 9.96; N, 15.57.

EXAMPLE 3

5-Chloro-2-[3-(methylaminomethyl)-5-methyl-4H-1,2,4-triazol-4-yl]benzophenone

A stirred suspension of 5-chloro-2-[3-(bromomethyl)-5-methyl-4H-1,2,4-triazol-4-yl]benzophenone (1.4 g., 0.00358 mole) in tetrahydrofuran (53 ml.) was cooled in an ice bath and treated with 45 ml. of a saturated solution of methylamine in methanol. The mixture was removed from the ice bath, stirred at ambient temperature for 30 min. and concentrated in vacuo. The residue was mixed with water and extracted with methylene chloride. The extract was dried over anhydrous potassium carbonate and concentrated. Crystallization of the residue from ethyl acetate gave 0.97 g. of 5-chloro-2-[3-(methylaminomethyl)-5-methyl-4H-1,2,4-triazol-4-yl]benzophenone of melting point 174°–175° C. The analytical sample had a melting point of 175°–176° C.

Anal. calcd. for $C_{18}H_{17}ClN_4O$:
C, 63.43; H, 5.03; Cl, 10.40; N, 16.44.
Found: C, 63.43; H, 5.14; Cl, 10.49; N, 16.52.

EXAMPLE 4

2',5-dichloro-2-[3-(dimethylaminomethyl)-5-methyl-4H-1,2,4-triazol-4-yl]benzophenone In the manner given in Example 1, 2', 5-dichloro-2-[3-(bromomethyl)-5-methyl-4H-1,2,4-triazol-4-yl]benzophenone was reacted with dimethylamine to give 2',5-dichloro-2-[3-(dimethylaminomethyl)-5-methyl-4H-1,2,4-triazol-4-yl]benzophenone of melting point 127.5°–130° C.

Anal. calcd. for $C_{19}H_{18}Cl_2N_4O$:
C, 58.62; H, 4.66; N, 14.40; Cl, 18.21.
Found: C, 58.50; H, 4.57; N, 14.39; Cl, 18.30.

EXAMPLE 5

2',5-Dichloro-2-[3-(dimethylaminomethyl)-5-cyclopropyl-4H-1,2,4-triazol-4-yl]benzophenone In the manner given in Example 1, 2',5-dichloro-2-[3-(chloromethyl)-5-cyclopropyl-4H-1,2,4-triazol-4-yl]-benzophenone was reacted with dimethylamine to give 2',5-dichloro-2-[3-(dimethylaminomethyl)-5-cyclopropyl-4H-1,2,4-triazol-4-yl]benzophenone of melting point 109°–115° C.

Anal. calcd. for $C_{21}H_{20}Cl_2N_4O$:
C, 60.73; H, 4.85; N, 13.49; Cl, 17.07.
Found: C, 60.64; H, 4.86; N, 13.61; Cl, 17.17.

EXAMPLE 6

2'-Chloro-2-[3-(dimethylaminomethyl)-5-methyl-4H-1,2,4-triazol-4-yl]benzophenone In the manner given in Example 1, 2'-chloro-2-[3-(bromomethyl)-5-methyl-4H-1,2,4-triazol-4-yl]benzophenone was reacted with dimethylamine to give 2'-chloro-2-[3-(dimethylaminomethyl)-5-methyl-4H-1,2,4-triazol-4-yl]benzophenone of melting point 147°–150° C.

Anal. calcd. for $C_{19}H_{19}ClN_4O$:
C, 64.31; H, 5.40; N, 15.79; Cl, 9.99.
Found: C, 64.15; H, 5.34; N, 15.75; Cl, 10.08.

EXAMPLE 7

5-Chloro-2-[3-(pyrrolidinomethyl)-5-methyl-4H-1,2,4-triazol-4-yl]benzophenone

In the manner given in Example 1, 5-chloro-2-[3-(iodomethyl)-5-methyl-4H-1,2,4-triazol-4-yl]benzophenone was reacted with pyrrolidine to give 5-chloro-2-[3-(pyrrolidinomethyl)-5-methyl-4H-1,2,4-triazol-4-yl]benzophenone of melting point 169.5°–171.5° C.

Anal. calcd. for $C_{21}H_{21}ClN_4O$:
C, 66.22; H, 5.56; N, 14.71; Cl, 9.31.
Found: C, 66.00; H, 5.84; N, 14.44; Cl, 8.94.

EXAMPLE 8

5-Chloro-2-[3-(morpholinomethyl)-5-methyl-4H-1,2,4-triazol-4-yl]benzophenone

In the manner given in Example 1, 5-chloro-2-[3-(bromomethyl)-5-methyl-4H-1,2,4-triazol-4-yl]benzophenone was reacted with morpholine to give 5-chloro-2-[3-(morpholinomethyl)-5-methyl-4H-1,2,4-triazol-4-yl]benzophenone of melting point 128.5°–130.5° C.

Anal. calcd. for $C_{21}H_{21}ClN_4O_2$:
C, 63.56; H, 5.34; N, 14.12; Cl, 8.93.
Found: C, 63.41; H, 5.37; N, 14.21; Cl, 9.08.

EXAMPLE 9

5-Chloro-2-[3-(piperidinomethyl)-5-methyl-4H-1,2,4-triazol-4-yl]benzophenone hydrochloride In the manner given in Example 1, 5-chloro-2-[3-(bromomethyl)-5-methyl-4H-1,2,4-triazol-4-yl]benzophenone was reacted with piperidine to give 5-chloro-2-[3-(piperidinomethyl)-5-methyl-4H-1,2,4-triazol-4-yl]benzophenone which was treated with hydrochloric acid in ether to give the corresponding salt of melting point 228°–240° C. (dec.).

EXAMPLE 10

2',5-Dichloro-2-[3-(pyrrolidinomethyl)-5-methyl-4H-1,2,4-triazol-4-yl]benzophenone In the manner given in Example 1, 2',5-dichloro-2-[3-(bromomethyl)-5-methyl-4H-1,2,4-triazol-4-yl]benzophenone was reacted with pyrrolidine to give 2',5-dichloro-2-[3-(pyrrolidinomethyl)-5-methyl-4H-1,2,4-triazol-4-yl]benzophenone of melting point 131°–132° C.

Anal. calcd. for $C_{21}H_{20}Cl_2N_4O$:
C, 60.75; H, 4.86; N, 13.40; Cl, 17.07.
Found: C, 60.55; H, 4.94; N, 13.41; Cl, 16.66.

EXAMPLE 11

6-ethylthio-2-[3-(hexamethyleneiminomethyl)-5-ethyl-4H-1,2,4-triazol-4-yl]benzophenone In the manner given in Example 1, 6-ethylthio-2-[3-(iodomethyl)-5-ethyl-4H-1,2,4-triazol-4-yl]benzophenone was reacted with hexamethyleneimine to give 6-ethylthio-2-[3-(hexamethyleneiminomethyl)-5-ethyl-4H-1,2,4-triazol-4-yl]benzophenone.

EXAMPLE 12

5-Bromo-3'-ethyl-4-isopropyl-2-[3-(ethylaminomethyl)-5-propyl-4H-1,2,4-triazol-4-yl]benzophenone In the manner given in Example 1, 5-bromo-3'-ethyl-4-isopropyl-2-[3-(bromomethyl)-5-propyl-4H-1,2,4-triazol-4-yl]benzophenone was reacted with ethylamine to give 5-bromo-3'-ethyl-4-isopropyl-2-[3-(ethylaminomethyl)-5-propyl-4H-1,2,4-triazol-4-yl]benzophenone.

EXAMPLE 13

3'-Bromo-4-propyl-2-[3-(morpholinomethyl)-5-isopropyl-4H-1,2,4-triazol-4-yl]benzophenone In the manner given in Example 1, 3'-bromo-4-propyl-2-[3-(iodomethyl)-5-isopropyl-4H-1,2,4-triazol-4-yl]benzophenone was reacted with morpholine to give 3'-bromo-4-propyl-2-[3-(morpholinomethyl)-5-isopropyl-4H-1,2,4-triazol-4-yl]benzophenone.

In the manner given in the preceding Examples other 2-[3-(substitutedaminomethyl)-1,2,4-triazol-4-yl]benzophenones of formula II can be obtained by reacting a 2-[3-(halomethyl)-1,2,4-triazol-4-yl]benzophenone (I) with a selected amine

defined as above. Representative compounds, thus obtained, include:

2',6'-difluoro-5-chloro-2-[3-(diethylaminomethyl)-5-methyl-1,2,4-triazol-4-yl]benzophenone;
5-nitro-4'-trifluoromethyl-2-[3-(piperidinomethyl)-1,2,4-triazol-4-yl]benzophenone;
5,6-dibromo-3'-amino-2-[3-(dimethylaminomethyl)-5-ethyl-1,2,4-triazol-4-yl]benzophenone;
5-(diethylamino)-2',4'-dipropyl-2-[3-(ethylaminomethyl)-5-methyl-1,2,4-triazol-4-yl]benzophenone;
5-(diethylamino)-2',4'-dipropyl-2-[3-(diethylaminomethyl)-5-methyl-1,2,4-triazol-4-yl]benzophenone;
3-propylthio-4'-propyl-2-[3-(morpholinomethyl)-5-methyl-1,2,4-triazol-4-yl]benzophenone; and the like.

Treating the compounds of formula II (including compound IIA and IIB) with pharmacologically acceptable acid such as hydrochloric, hydrobromic, phosphoric, sulfuric, acetic, propionic, toluenesulfonic, methanesulfonic, tartaric, citric, lactic, malic, maleic, cyclohexanesulfamic acids, produces the pharmacologically acceptable salts of these compounds of formula II which can be used like the free base compounds of formula II. Salt formation is achieved in conventional manner by reacting the compounds of formula II with excess of a selected acid in a suitable medium e.g. water, a lower alkanol, ether, or acetone and recovering the salt by evaporating the solvent, preferably in vacuo.

I claim:

1. A 2-[3-(substitutedaminomethyl)-4H-1,2,4-triazol-4-yl]benzophenone of the formula II:

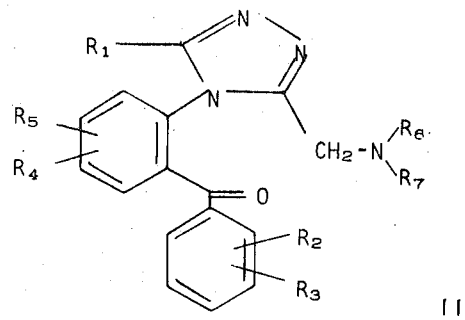

wherein $R_1$ is selected from the group consisting of hydrogen and alkyl of 1 to 3 carbon atoms, inclusive and cyclopropyl; wherein $R_2$, $R_3$, $R_4$, and $R_5$ are selected from the group consisting of hydrogen, alkyl defined as above, fluorine, chlorine, bromine, nitro, trifluoromethyl, and alkylthio in which alkyl is defined as above; and wherein $R_6$ and $R_7$ are selected from the group consisting of hydrogen and alkyl of 1 to 5 carbon atoms, inclusive, with the proviso that only one of the parameters $R_6$ or $R_7$ can be hydrogen, or together the group $$-N\begin{matrix}R_8\\R_7\end{matrix}$$

is a heterocyclic amino group selected from pyrrolidino, piperidino, morpholino, and hexamethyleneimino, and the pharmacologically acceptable acid addition salts thereof.

2. A compound according to claim 1 of the formula IIA

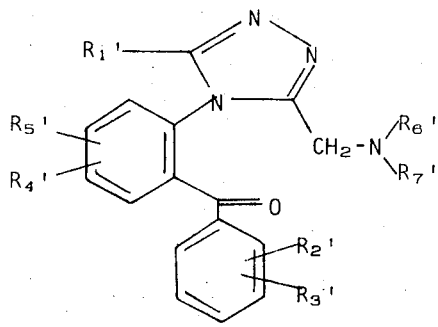

IIA wherein $R_1'$ is alkyl of 1 to 3 carbon atoms, inclusive; wherein $R_2'$, $R_3'$, $R_4'$, and $R_5'$ are hydrogen, fluorine, chlorine or bromine; wherein $R_6'$ and $R_7'$ are selected from the group consisting of hydrogen and alkyl as defined above, with the proviso that only one of the parameters $R_6'$ or $R_7'$ can be hydrogen, or together

is selected from the group consisting of pyrrolidino, piperidino, and morpholino, and the pharmacologically acceptable acid salts thereof.

3. A compound according to claim 1 of the formula

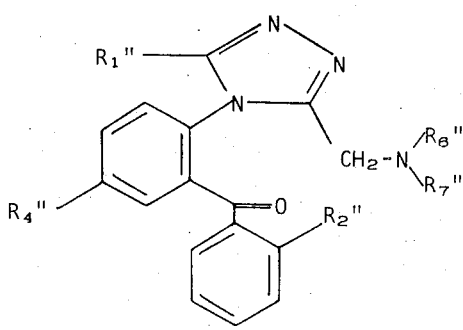

wherein $R_1''$ is methyl; wherein $R_2''$ and $R_4''$ are hydrogen or chlorine, and wherein $R_6''$ is hydrogen, methyl, or ethyl, $R_7''$ is methyl or ethyl or together

are selected from the group consisting of pyrrolidino, piperidino, and morpholino, and the pharmacologically acceptable acid addition salts thereof.

4. The compound according to claim 3 wherein $R_1''$ is methyl, $R_2''$ is hydrogen, $R_4''$ is chloro, $R_6''$ and $R_7''$ are ethyl, and the compound is therefore 5-chloro-2-[3-(diethylaminomethyl)-5-methyl-4H-1,2,4-triazol-4-yl]benzophenone.

5. The compound according to claim 3 wherein $R_1''$ is methyl, $R_2''$ is hydrogen, $R_4''$ is chloro, $R_6''$ and $R_7''$ are methyl and the compound is therefore 5-chloro-2-[3-(dimethylaminomethyl)-5-methyl-4H-1,2,4-triazol-4-yl]benzophenone.

6. The compound according to claim 3 wherein $R_1''$ is methyl, $R_2''$ and $R_6''$ are hydrogen, $R_4''$ is chloro, $R_7''$ is methyl and the compound is therefore 5-chloro-2-[3-(methylaminomethyl)-5-methyl-4H-1,2,4-triazol-4-yl]benzophenone.

7. The compound according to claim 3, wherein $R_1''$ is methyl, $R_2''$ and $R_4''$ are chloro, $R_6''$ and $R_7''$ are methyl and the compound is therefore 2',5-dichloro-2-[3-(dimethylaminomethyl)-5-methyl-4H-1,2,4-triazol-4-yl]benzophenone.

8. The compound according to claim 1, wherein $R_1$ is cyclopropyl, $R_3$ and $R_5$ are hydrogen, $R_2$ is o-chloro, $R_4$ is 5-chloro, $R_6$ and $R_7$ are methyl and the compound is therefore 2',5-dichloro-2-[3-(dimethylaminomethyl)-5-cyclopropyl-4H-1,2,4-triazol-4-yl]benzophenone.

9. The compound according to claim 3 wherein $R_1''$ is methyl, $R_4''$ is hydrogen, $R_2''$ is chloro, $R_6''$ and $R_7''$ are methyl and the compound is therefore 2'-chloro-2-[3-(dimethylaminomethyl)-5-methyl-4H-1,2,4-triazol-4-yl]benzophenone.

10. The compound according to claim 3 wherein $R_1''$ is methyl, $R_2''$ is hydrogen, $R_4''$ is chloro,

is pyrrolidino and the compound is therefore 5-chloro-2-[3-(pyrrolidinomethyl)-5-methyl-4H-1,2,4-triazol-4-yl]benzophenone.

11. The compound according to claim 3 wherein $R_1''$ is methyl, $R_2''$ is hydrogen, $R_4''$ is chloro,

is morpholino and the compound is therefore 5-chloro-2-[3-(morpholinomethyl)-5-methyl-4H-1,2,4-triazol-4-yl]benzophenone.

12. The compound according to claim 3 as the hydrochloride wherein $R_1''$ is methyl, $R_2''$ is hydrogen, $R_4''$ is chloro,

is piperidino and the compound is therefore 5-chloro-2-[3-(piperidinomethyl)-5-methyl-4H-1,2,4-triazol-4-yl]benzophenone hydrochloride.

13. The compound according to claim 3 wherein $R_1''$ is methyl, $R_2''$ is chloro, $R_4''$ is chloro,

is pyrrolidino and the compound is therefore 2',5-dichloro-2-[3-(pyrrolidinomethyl)-5-methyl-4H-1,2,4-triazol-4-yl]benzophenone.

* * * * *